United States Patent Office 3,220,250
Patented Nov. 30, 1965

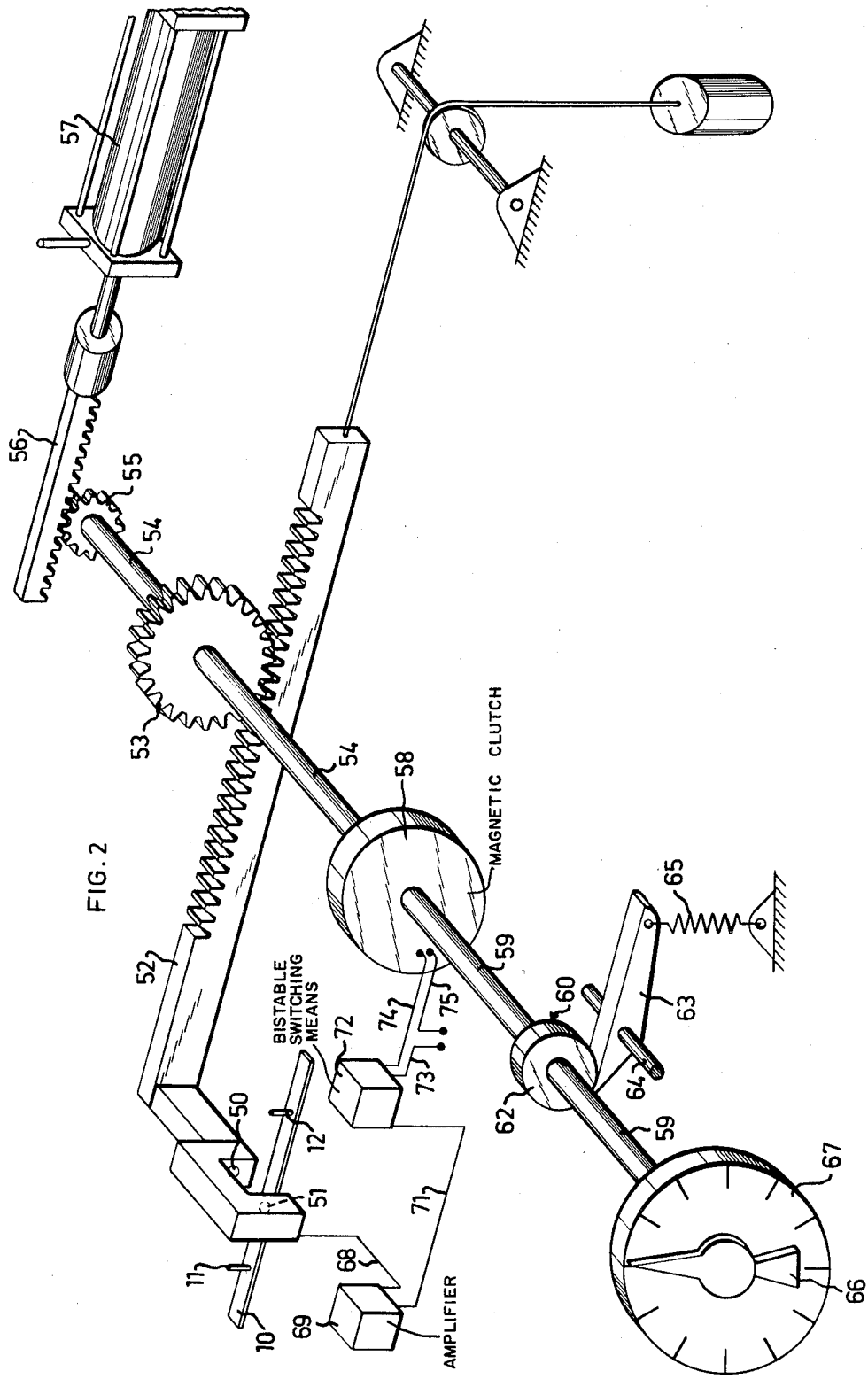

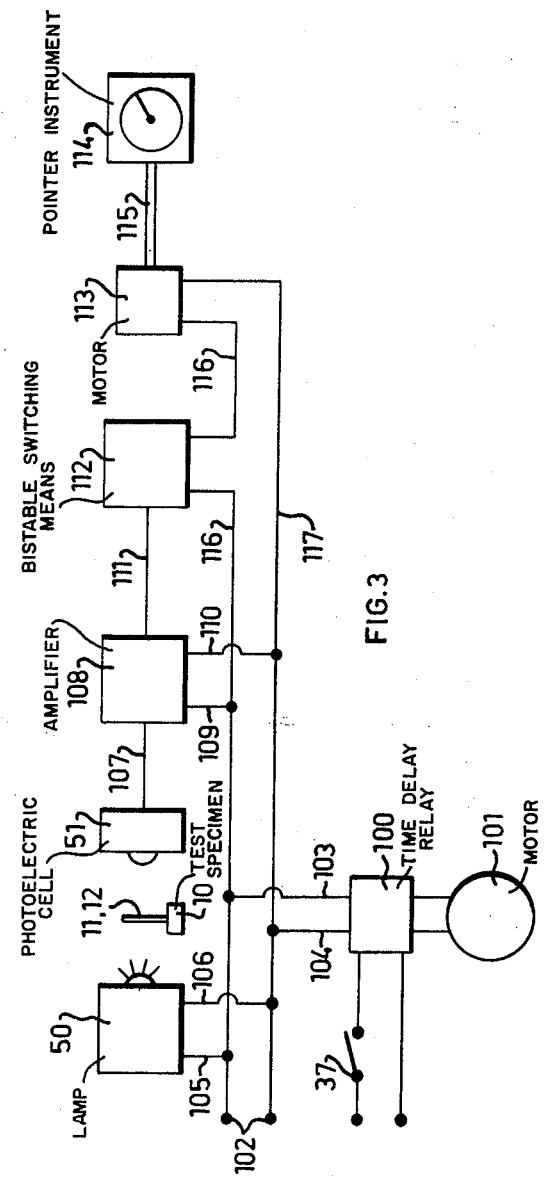

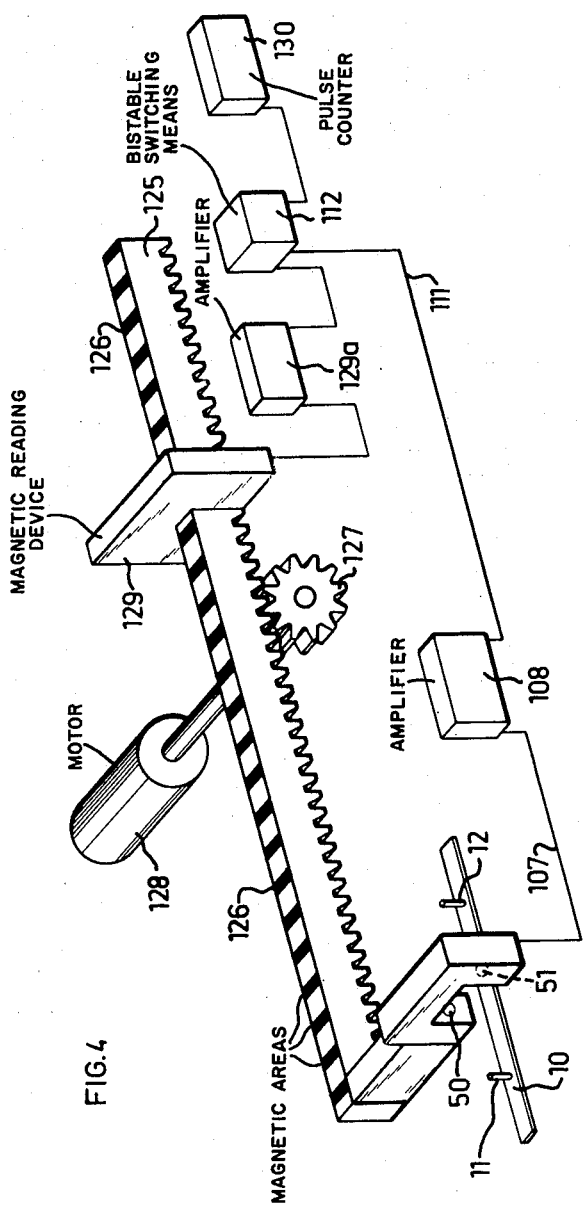

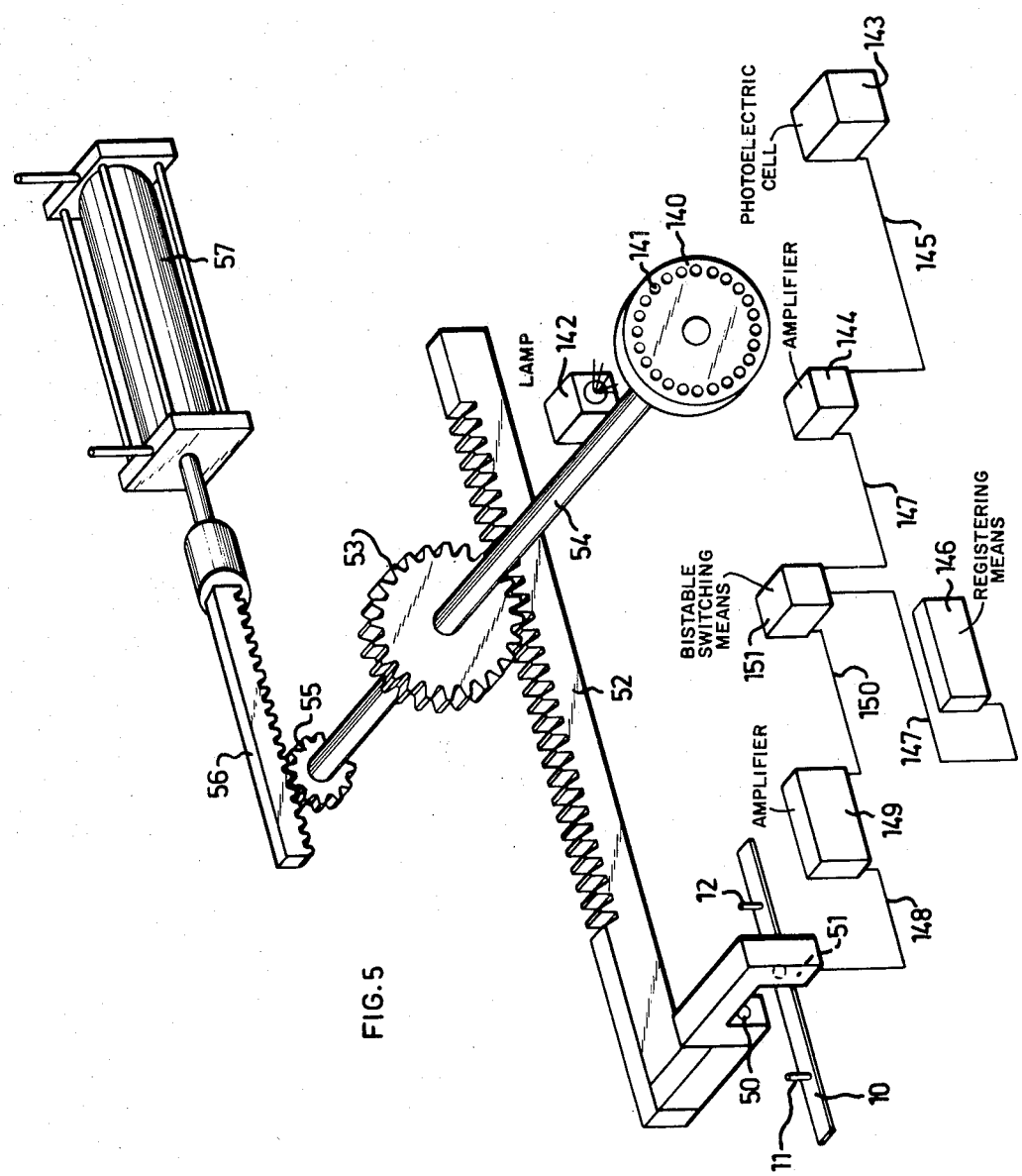

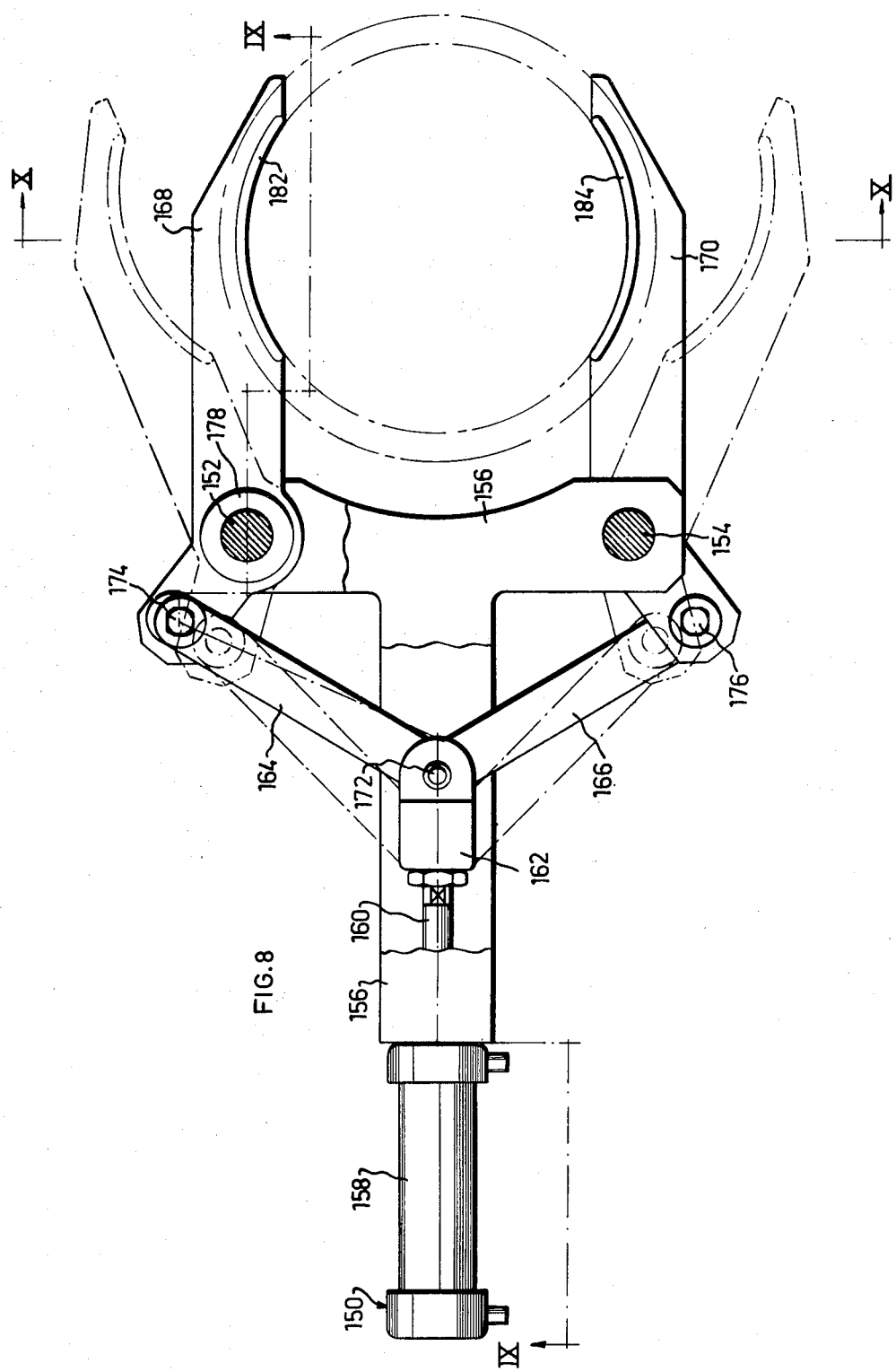

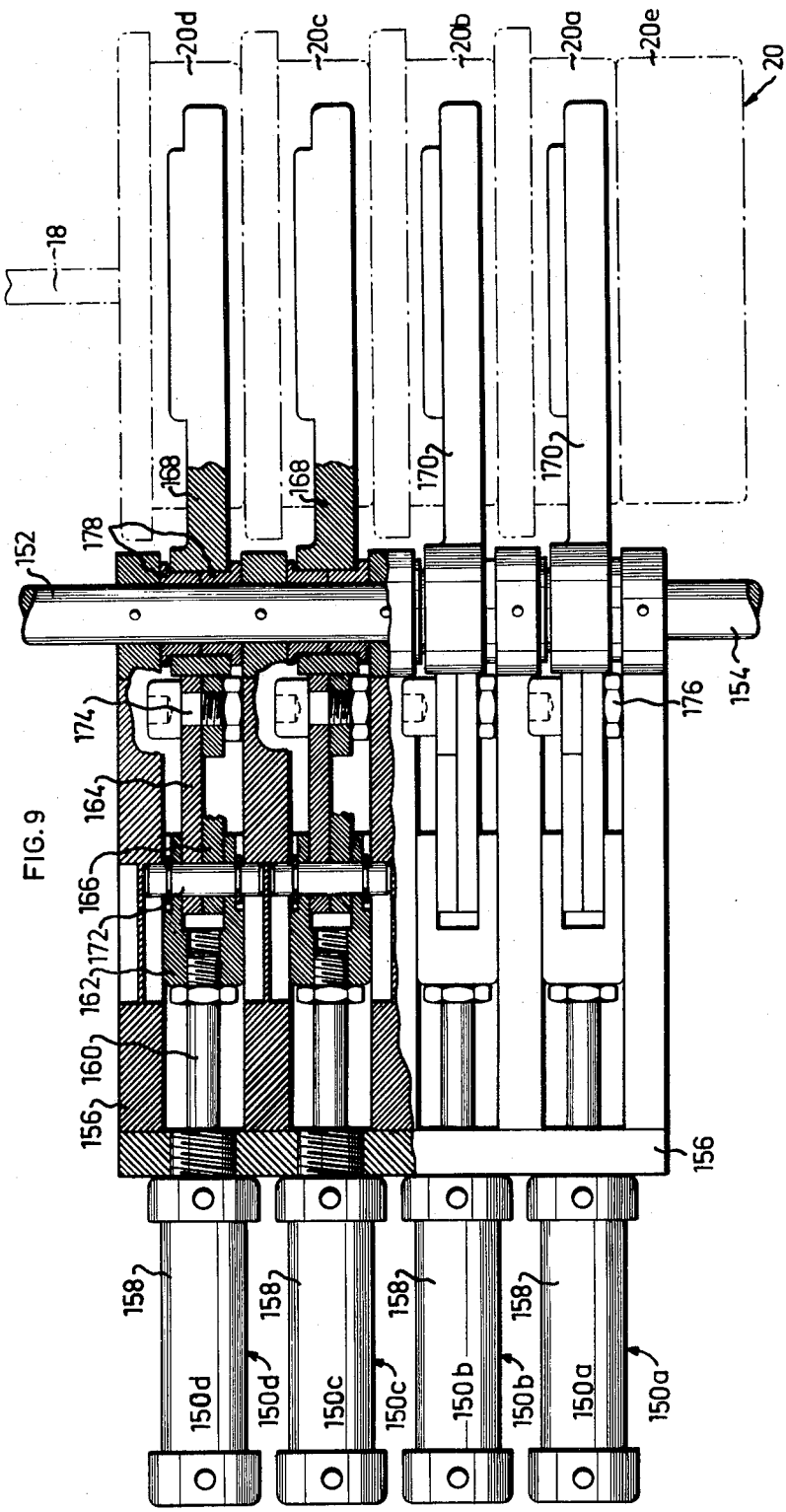

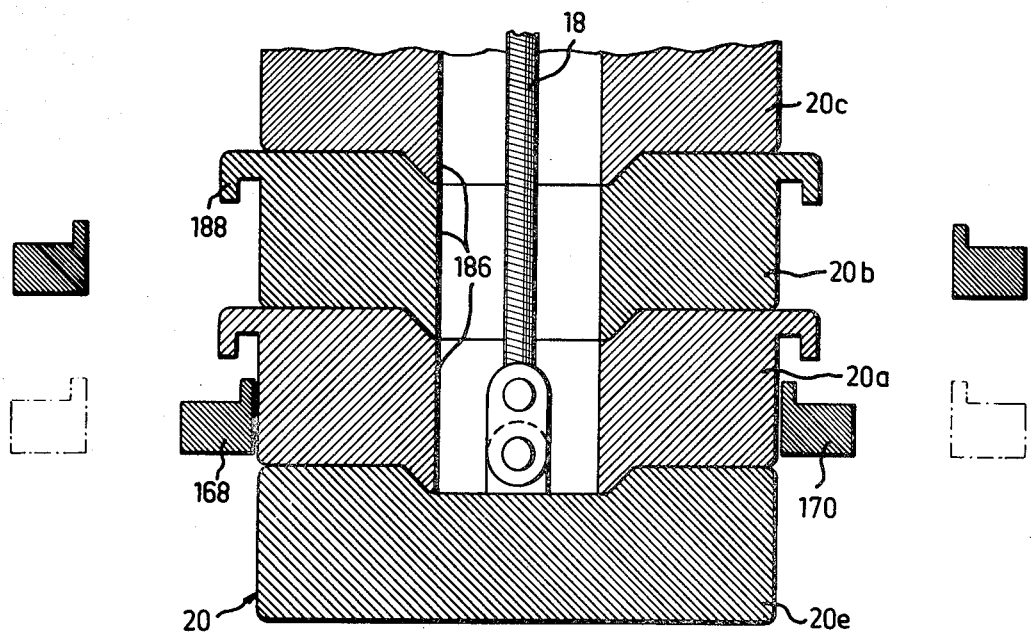
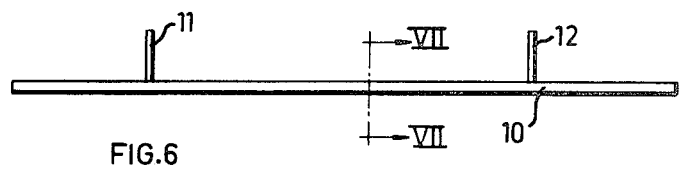
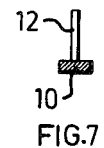

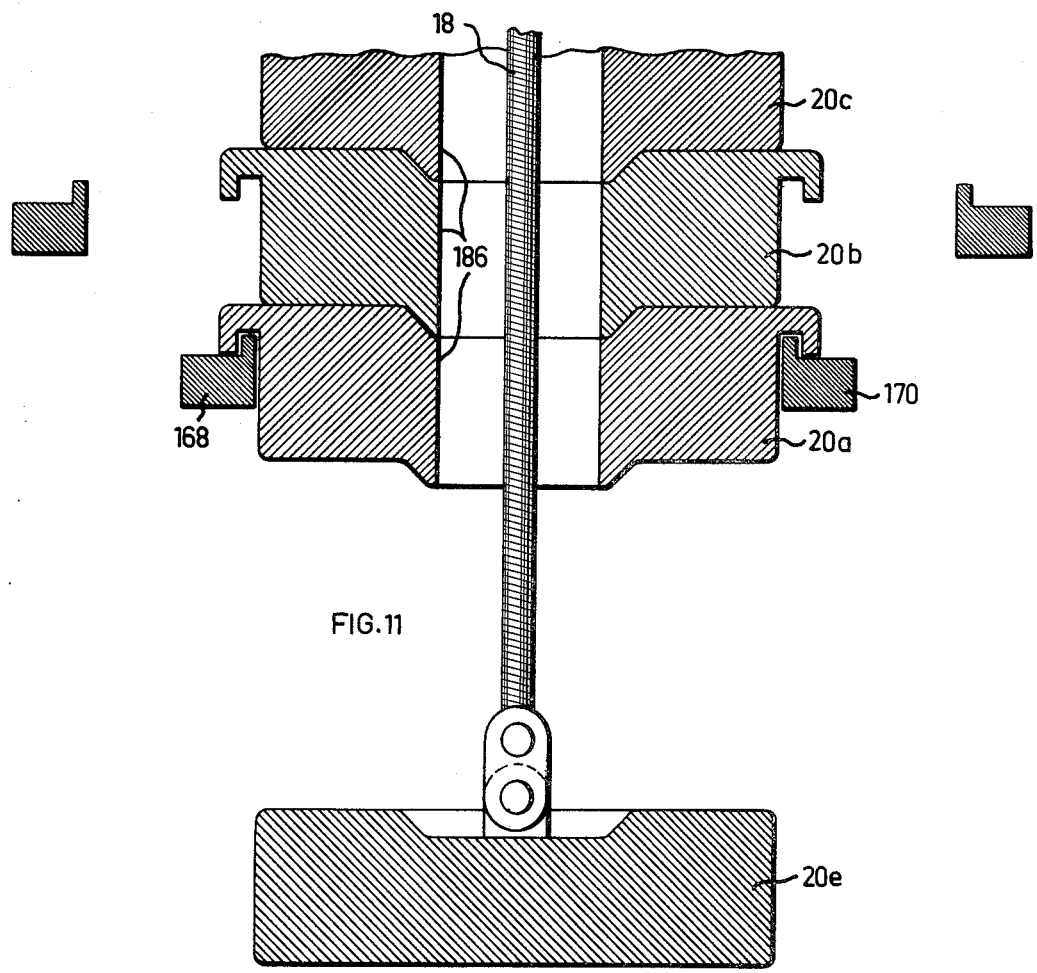

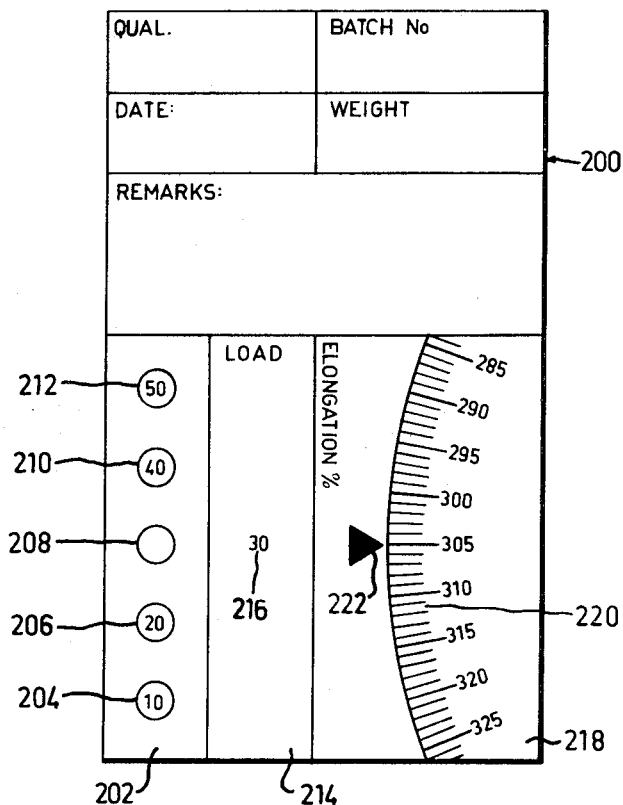

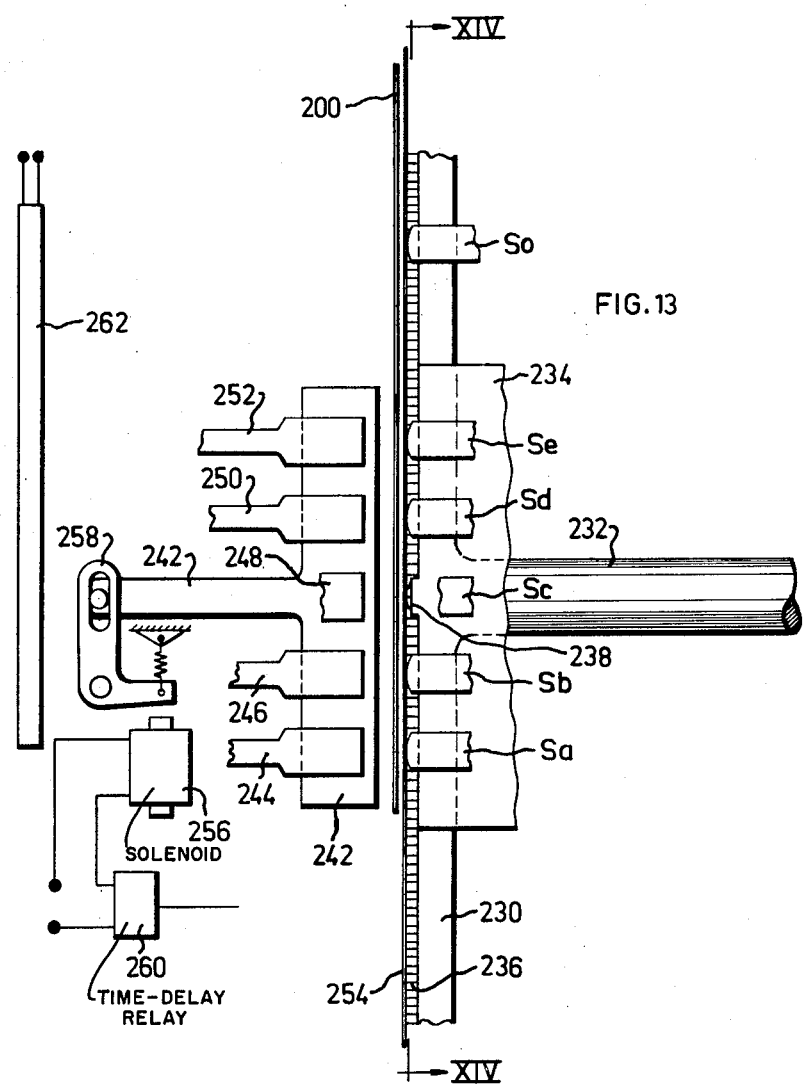

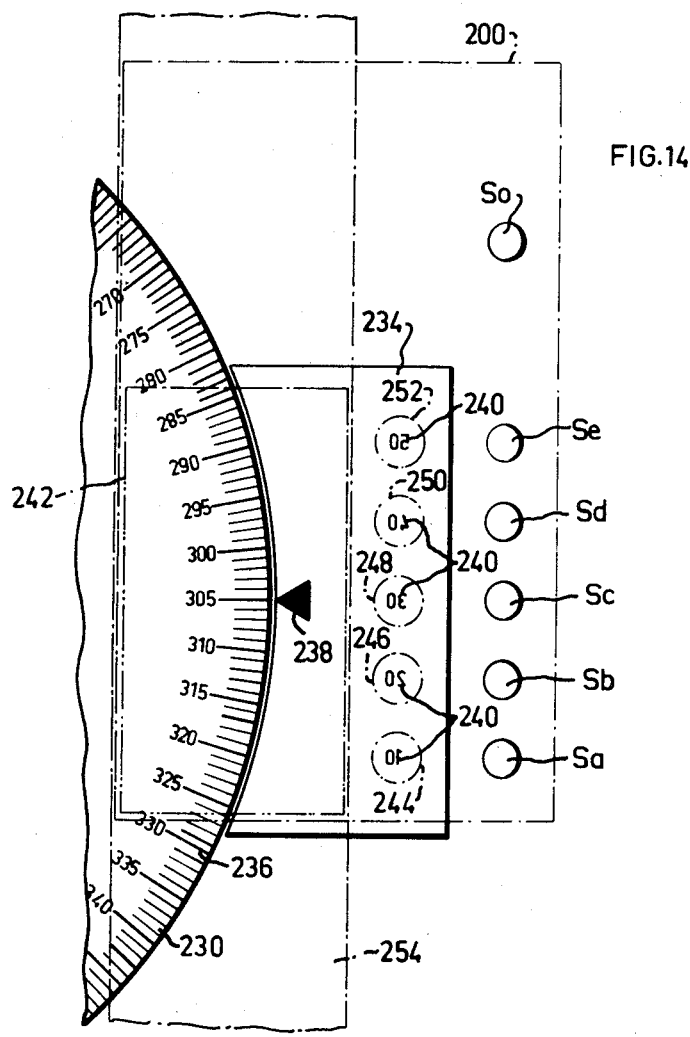

3,220,250
APPARATUS FOR TESTING RUBBER
Ernst Clementz Strandquist and Gustav Georg Olsson, Trelleborg, Sweden, assignors to Trelleborgs Gummifabriks Aktiebolag, Trelleborg, Sweden, a corporation of Sweden
Filed Sept. 10, 1962, Ser. No. 222,595
Claims priority application Sweden, Sept. 18, 1961, 9,231/61
13 Claims. (Cl. 73—95)

This invention relates to the testing of rubber mixtures. Upon testing of rubber mixtures in general, the strength, modulus and hardness thereof are tested. The testing by means of an apparatus according to the invention may be compared primarily with a modulus testing although it is not performed in exactly the same manner. The conventional testing procedures do not yield sufficiently exact results as considerable variations regarding the composition of the rubber mixtures may arise without this being discovered at the testing.

One object of the invention is to overcome this disadvantage, and in utilizing the apparatus according to the present invention very small variations in the composition of the rubber mixtures can be established.

The apparatus according to the invention comprises means for clamping a test specimen having an elongated body portion and two projections located at a predetermined distance from each other along the body portion and extending in the same direction therefrom, means for stretching the test specimen with a predetermined force specified for the test specimen and increasing the distance between the projections, a transmitter for transmitting a sensing radiation beam, a receiver for receiving the beam from said transmitter, mounting means supporting said transmitter and said receiver in fixed and spaced relation relative to each other, means for moving said transmitter and said receiver along the stretched test specimen past the two projections thereon so as to intercept the beam between said transmitter and said receiver by the projections of the test specimen, said receiver being adapted to generate a first output signal when the beam is intercepted by one of the projections of the test specimen, and a second output signal when the beam is intercepted by the other projection, means connected to said receiver and responding to the output signals thereof for starting a measuring run in response to the first output signal from said receiver and stopping the measuring run in response to the second output signal from said receiver, and means operated by said last mentioned means for indicating a test result value based on the increase of the distance between the projections of the stretched test specimen as determined by the measuring run.

The invention also has for its object to provide automatic control and recording means reading a data card e.g. in the form of a punched card and selecting the load on the test specimen corresponding to data on said data card and starting the testing apparatus after the load has been selected, said control and recording means checking that the test specimen has been loaded corresponding to the data indicated and finally printing the test result value on said data card.

For better understanding the invention will be described more in detail in the following, reference being made to the accompanying drawings illustrating some embodiments of a testing apparatus according to the invention. In the drawings:

FIG. 1 diagrammatically shows a stretching apparatus useful in carrying out the method according to the invention;

FIG. 2 diagrammatically shows a measuring apparatus according to the invention;

FIG. 3 shows a wiring diagram for another embodiment of the measuring apparatus according to the invention;

FIG. 4 diagrammatically shows a further embodiment of the measuring apparatus according to the invention;

FIG. 5 shows still another embodiment of a measuring apparatus according to the invention;

FIG. 6 shows a test specimen employed in carrying out the method according to the invention;

FIG. 7 is a section on line VII—VII in FIG. 6;

FIG. 8 is a plan view of a gripping mechanism, certain parts being broken away;

FIG. 9 is a section substantially on line IX—IX in FIG. 8;

FIG. 10 is a section substantially on line X—X in FIG. 8;

FIG. 11 shows the same section as in FIG. 10 but illustrates another position of the parts;

FIG. 12 shows a punched card for an all-automatic or semi-automatic testing apparatus according to the invention;

Figure 15:
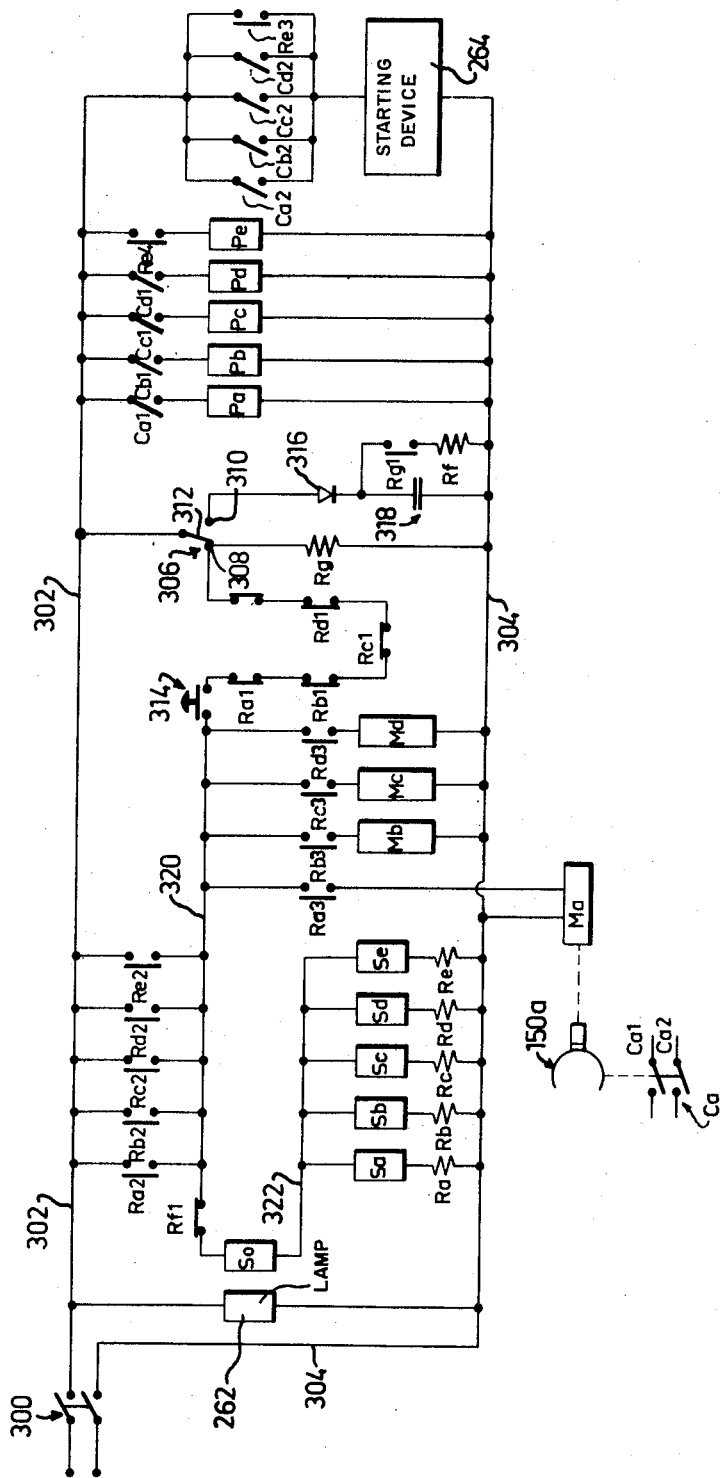

FIG. 13 diagrammatically shows a section of control and recording means for the testing apparatus according to the invention;

FIG. 14 is a section on line XIV—XIV in FIG. 13;

FIG. 15 shows a wiring diagram for the control and recording means illustrated in FIGS. 13 and 14.

Figure 1:
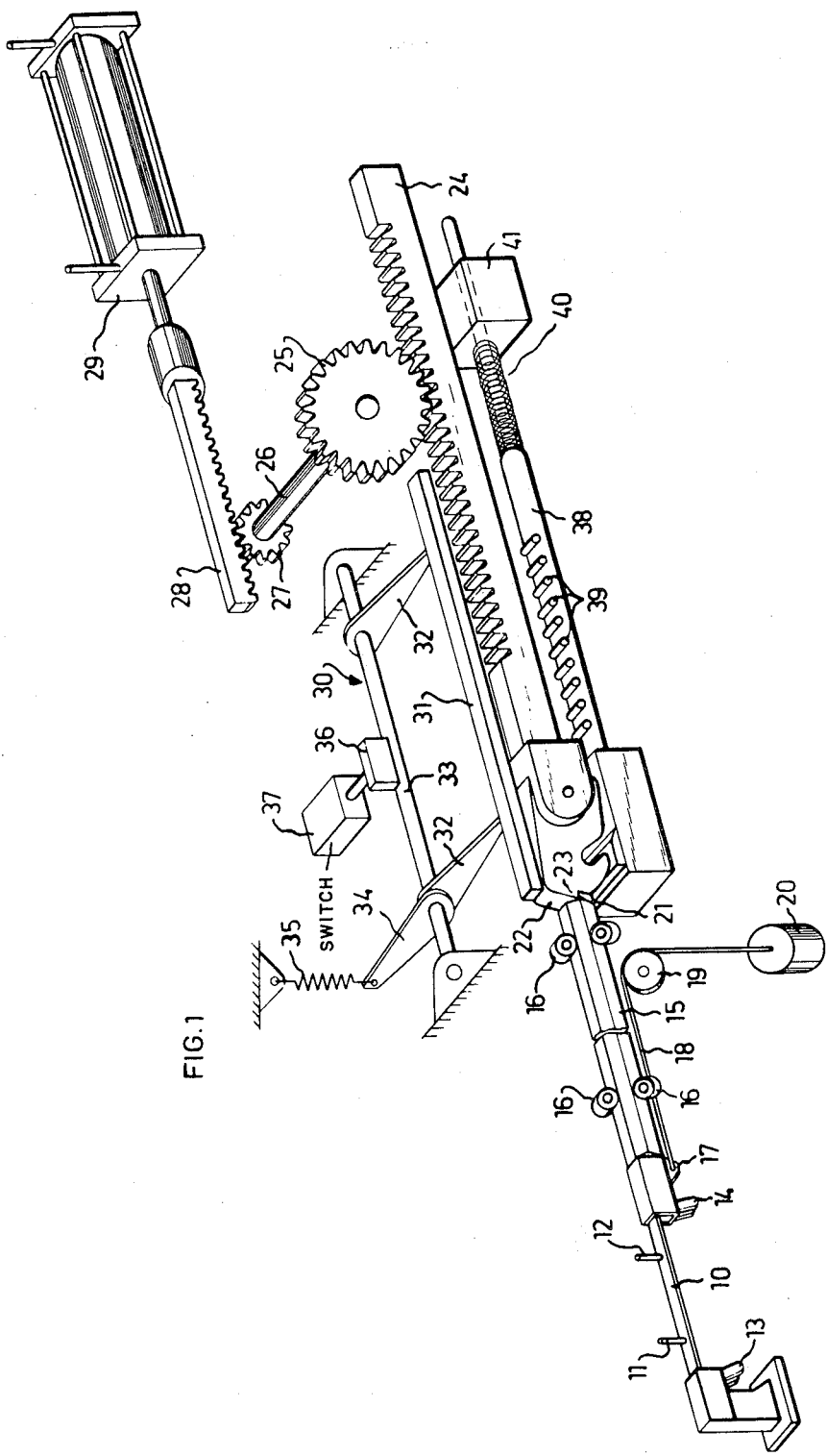

In the apparatus illustrated in FIG. 1 (the frame of this apparatus is not shown) there is clamped a test specimen 10 having two projections 11, 12 in a fixedly arranged clamp 13 and a movably arranged clamp 14. The clamp 14 is attached to the end of an axially movable bar 15 of hexagonal cross section. The bar 15 is guided in bearings 16 mounted in the apparatus frame and comprises a lug 17 adjacent the clamp 14. Attached to the lug 17 is a thin cord or a thin wire 18 which extends along the bar 15 and passes over a pulley 19 which is mounted for rotation in the apparatus frame. A weight 20 is secured at the free end of the cord 18. As will be described later, the weight 20 may actually consist of several weights so that the load on the test specimen 10 can be varied as desired.

The free end of the bar 15 has a shoulder 21, and a hook 22 rests with its shoulder 23 on said shoulder 21 of the bar 15. The hook 22 is pivotally connected to a rack 24. The rack 24 meshes with a gear 25 which is connected over a shaft 26 mounted in the apparatus frame to a second gear 27. The gear 27 meshes with a second rack 28 which constitutes the free end of a piston rod of a hydraulic or pneumatic cylinder 29 which is secured to the apparatus frame. Pressure fluid is supplied to the cylinder from a pressure source (not shown).

An operating means 30 is supported on the upper side of the hook 22 by means of a sliding rail 31. The latter is fixed to one end of a rocker 32 which has its other end connected to a shaft 33 which is mounted for rotation in the apparatus frame. Said shaft 33 has a further rocker 34 which projects relative to the rocker 32 in the opposite direction from said shaft 33. Attached to the free end of the rocker 34 is a tension spring 35 which is anchored to the frame of the stretching apparatus. The spring 35 urges the rocker 34 in such a direction that the sliding rail 31 is pressed against the hook 22. The shaft 33 also has a projection 36 which actuates a switch 37. Disposed beneath the hook 22 is a bar 38 which extends along the rack 24. The bar 38 has transverse ribs 39 and is axially movable. Engaging one end of said bar is a pressure spring 40 which rests on a fixed abutment 41 on the apparatus frame.

FIG. 2 illustrates an embodiment of a measuring apparatus according to the invention. This measuring apparatus comprises a sensing radiation transmitter 50 and a sensing radiation receiver 51. The transmitter 50 and the receiver 51 are fixedly interconnected. In the embodiment illustrated the transmitter 50 is a light source and the receiver 51 a photoelectric cell, but it is readily understood that other means can be used for these purposes. The light source 50 and the photoelectric cell 51 are fixedly connected to a rack 52 the teeth of which mesh with a gear 53. The gear 53 is fixedly connected to a shaft 54 mounted on the apparatus frame (not shown). The shaft 54 is connected to a further gear 55 which in turn meshes with a second rack 56. The rack 56 is the free end of a piston rod of a hydraulic or pneumatic cylinder 57 which is attached to the apparatus frame. The cylinder 57 is connected to a pressure fluid supply (not shown). The shaft 54 is also connected to the input member of a magnetic clutch 58. The output member of the magnetic clutch 58 is connected to a shaft 59 which is mounted in the apparatus frame. The shaft 59 is loaded by a brake 60 comprising a friction disk 62 and a two-armed rocker 63 which is rockably mounted on a shaft 64 connected to the apparatus frame and which is fixedly connected to a spring 65 at one end and exerts a pressure on the friction disk 62 by means of its other end. The spring 65 is anchored in the frame of the measuring apparatus. Secured to the free end of the shaft 59 is a pointer 66 which indicates the angular position of the shaft 59 on a dial 67.

The photoelectric cell 51 is connected via a line 68 to an amplifier 69 which in turn is connected via a line 71 to a clutch operating means 72. In the embodiment illustrated, the means 72 is an electromechanic or electronic bistable switching means e.g. a bistable relay and is adapted to control the supply of current to the magnetic clutch 58. The bistable switching means 72 is connected to one pole of a source of current via a line 73 and connected to one end of the winding of the magnetic clutch 58 via a line 74. The other end of the winding of the magnetic clutch 58 is connected to the other pole of the current supply via a line 75.

The function of the apparatus illustrated in FIGS. 1 and 2 is as follows: When the test specimen 10 has been clamped between the clamps 13 and 14 pressure fluid is fed from the pressure fluid supply (not shown) to the cylinder 29 so that the rack 28 is moved outward in said cylinder. The gear 27 will then rotate clockwise as viewed in FIG. 1. The gear 27 rotates the shaft 26 and thus also the gear 25. The gear 25 moves the rack 24 to the right as viewed in FIG. 1. The bar 15 loaded with the weight 20 and bearing against the hook 22 takes part in the movement of the rack 24, the hook 22 remaining hooked onto the shoulder 21 of the bar 15. When balance is reached between the weight 20 and the tension in the test specimen 10 the displacement of the bar 15 ceases. The rack 24, however, is moved further, and the hook 22 will therefore fall down from the shoulder 21 and be hooked onto one of the transverse ribs 39 of the bar 38, carrying said bar 38 along against the action of the pressure spring 40. When the hook 22 falls down from the shoulder 21 the spring 35 will cause the sliding rail 31 to move downwardly, for which reason the shaft 33 is rotated clockwise. The switch 37 will then be engaged and actuate a time-delay relay (not shown in this embodiment) which controls the starting of the driving means 57 of the measuring apparatus. After the elapse of a certain time the driving means of the measuring apparatus is started by supplying pressure fluid behind the piston of the hydraulic cylinder 57 so that the rack 56 is moved out of the cylinder. The gear 55 will now rotate and carry along the shaft 54 and the gear 53 in the rotation. The gear 53 moves the rack 52 to the right as viewed in FIG. 2. The holder for the light source 50 and the photoelectric cell 51 will then be moved along the stretched test specimen 10. When the holder passes the projection 11 of the test specimen the photoelectric cell 51 generates a pulse which is amplified by the amplifier 69 and actuates the bistable switching means 72 so that this closes the circuit to the magnetic clutch 58. The clutch 58 will then interconnect the shafts 54 and 59 so that the pointer 66 is rotated against the action of the brake 61. When the holder for the light source 50 and the photoelectric cell 51 passes the projection 12 of the test specimen the photoelectric cell generates another pulse which is amplified by the amplifier 69 and actuates the bistable switching means 72 so that this interrupts the energization of the magnetic clutch 58. This will render the magnetic clutch 58 inoperative and disengage the shaft 59 from the shaft 54. The shaft 59 ceases to rotate because it is under the action of the brake, and the pointer 66 thus stops in the new angular position of the shaft 59. The pointer 66 will thus indicate on the dial 67 a value which is proportional to the distance between the projections 11 and 12 of the test specimen. By suitably graduating the dial 67 the pointer 66 can be caused directly to indicate the percentage elongation of the test specimen 10.

The apparatus illustrated in FIGS. 1 and 2 may be equipped with means which interrupt the supply of pressure fluid to the cylinders 57 and 29 when the holder for the light source 50 and the photoelectric cell 51 passes the second projection 12 of the test specimen, and after such interruption the apparatus can be returned to initial position by hand. It is also possible to provide the apparatus with means which automatically return the apparatus to initial position after the light source 50 and the photoelectric cell 51 have passed the projection 12.

FIG. 3 shows the wiring diagram of another embodiment of the measuring apparatus. The measuring apparatus illustrated in FIG. 3 can be employed together with the stretching apparatus illustrated in FIG. 1. The wiring diagram includes the lamp 50 and the photoelectric cell 51 as well as the switch 37 which is shown in FIG. 1. The switch 37 is adapted to open and close an operating circuit, and when the switch is closed a time-delay relay 100 is actuated, which after a certain time has elapsed connects a motor 101 to the main current source 102. The motor 101 is a substitute of the hydraulic or pneumatic cylinder 57 in FIG. 2 and thus drives the lamp 50 and the photoelectric cell 51 so that these are moved along the test specimen 10 past the projections 11 and 12 thereof. The motor 101 is connected to the main current source via two lines 103 and 104, and the time-delay relay 100 operates in said lines. The lamp 50 is connected to the main current source 102 via two lines 105 and 106. The lamp 50 is adapted to direct a narrow light beam toward the photoelectric cell 51. When the light source 50 and the photoelectric cell 51 pass one of the projections 11, 12, this momentarily intercepts the illumination of the photoelectric cell, whereby said cell generates and output signal. The photoelectric cell 51 is connected via a line 107 to an amplifier 108 which is connected to the main current source 102 over two lines 109 and 110. The signal from the photoelectric cell 51 is amplified in the amplifier 108 and is fed from said amplifier over a line 111 to an electromechanic or electronic bistable switching means 112. A motor 113 is connected to the main current source, and this motor drives at constant speed a pointer instrument 114 by means of a shaft 115. The motor 113 is connected to the main current source over two lines 116 and 117. The bistable switching means 112 operates in the line 116 so that it can open and close the current supplying circuit to the motor 113. Said switching means is so designed as to close the circuit to the motor 113 when the lamp and the photoelectric cell travel past the projection 11 of the test specimen, and to open the circuit to the motor 113 when the lamp 50 and the photoelectric cell 51 travel past the projection 12 of the test specimen.

The function of the diagrammatically shown measuring apparatus is as follows: When the test specimen 10 has been stretched and balance has been reached between the test specimen and the weight 20 (see FIG. 1) the hook 22 falls down from the shoulder 21 of the bar 15, whereby the switch 37 is closed. The switch 37 then actuates the time-delay relay 100 so that the latter after a certain time connects the motor 101 to the main current source 102. The motor 101 is started and moves the lamp 50 and the photoelectric cell 51 at constant speed along the test specimen past the projections thereof. When the lamp 50 and the photoelectric cell 51 travel past the first projection 11 of the test specimen the light beam from the lamp to the photoelectric cell is intercepted and said cell generates a pulse which is amplified in the amplifier 108 and is employed to actuate the bistable switching means 112 so that the latter closes the circuit to the motor 113. The motor 113 starts and drives the pointer instrument 114 at constant speed. When the lamp and the photoelectric cell travel past the second projection 12 of the test specimen, a new pulse is generated which actuates the bistable switching means 112 so that the latter opens the circuit to the motor 113, thus stopping the motor and also the pointer instrument 114. The pointer instrument 114 will thus indicate a value which is proportional to the distance between the two projections 11, 12 of the stretched test specimen. If the distance between the projections of the non-stretched test specimen is standardized the dial of the pointer instrument 114 may be graduated in such a way that the percentage elongation can be read directly.

FIG. 4 diagrammatically shows a further embodiment of the measuring apparatus which can be used together with the stretching apparatus shown in FIG. 1. The lamp 50 and the photoelectric cell 51 are here fixed to a rack 125 corresponding to the rack 52 in the measuring apparatus shown in FIG. 2. The rack 125 is provided with magnetic areas 126 which are uniformly distributed along said rack. The rack 125 meshes with a gear 127 which is rotated by a motor 128 corresponding to the motor 101 in FIG. 3. The rack 125 extends through a magnetic reading device 129 (including a usual magnetic head) which is adapted to generate one pulse each time a magnetic area 126 is moved past the sensing head of the reading device. The pulses are amplified by an amplifier 129a and the number of pulses is counted with the aid of a pulse counter (decade counter) 130. The wiring diagram of the measuring apparatus shown in FIG. 4 substantially corresponds to that in FIG. 3, the bistable switching means 112 being adapted to open and close the connection between the magnetic reading device 129 and the pulse counter 130 so that the latter is caused to count the number of magnetic areas corresponding to the distance between the projections 11, 12, whereby the count of the pulse counter will represent the test result value based on the increase of the distance between the two projections, caused by the stretching.

FIG. 5 diagrammatically shows still another measuring apparatus which can be used together with the stretching apparatus illustrated in FIG. 1. The lamp 50 and the photoelectric cell 51 are fixedly connected to the rack 52 which exactly corresponds to the rack 52 shown in FIG. 2. The rack 52 meshes with the gear 53 on the shaft 54. Disposed on the shaft 54 is the gear 55 which meshes with the rack 56. The rack 56 is the free end of a piston rod in the hydraulic or pneumatic cylinder 57. Secured to the shaft 54 is a disk 140 having along its edge closely placed holes 141. A lamp 142 is arranged adjacent the disk 140 and directs a light beam through said holes 141. Mounted on the other side of the disk is a photoelectric cell 143 which is hit by the light beam from the lamp 142. The photoelectric cell is connected to an amplifier 144 over a line 145. The amplifier 144 is connected over a line 147 to a registering means 146 which is capable of counting the number of electric pulses supplied to it. The registering means 146 may be of any known types operating electromechanically or electronically. The photoelectric cell 51 is connected over a line 148 to an amplifier 149 which amplifies the pulses generated by the photoelectric cell 51 when said cell and the lamp 50 travel past the projections 11 and 12 of the test specimen 10. The amplified pulses from the photoelectric cell 51 are sent through a line 150 to an electromechanic or electronic bistable switching means 151 which can open and close the line 147. Said switching means 150 is adapted to connect the amplifier 144 to the registering means 146 when the photoelectric cell 51 moves past the projection 11 of the test specimen, and to break the connection between the amplifier 144 and the registering means 146 when the photoelectric cell 51 moves past the projection 12 of the test specimen. The registering means 146 will thus register the number of pulses generated by the photoelectric cell 143 between the two pulses from the photoelectric cell 51. Because the disk 140 rotates when the rack 52 is moved, the number of pulses from the photoelectric cell 143 will be directly proportional to the distance between the projections 11 and 12 of the test specimen.

FIGS. 6 and 7 illustrate the test specimen 10 proper. The test specimen is in the form of a relatively thin rubber strip from which the projections 11 and 12 extend. The projections are of such a width as to be able to intercept the light beam from the lamp 50 and the photoelectric cell 51.

It is readily understood that many modifications of the embodiments illustrated may be resorted to without departing from the inventive idea defined in the appended claims. Thus it is not necessary to place the stretching apparatus in FIG. 1 horizontally; it may also be placed vertically. In the vertical arrangement the weight 20 may be disposed directly on the bar 15. The cylinder 29 can be replaced by a motor, and the means that sense when balance has been reached between the weight 20 and the tension in the test specimen 10 can be given any other suitable form. The magnetic clutch 58 can be replaced by a conventional mechanical clutch which is operated by some means actuated by the signals from the photoelectric cell 51.

Many other modifications may be resorted to. For instance, the magnetic areas 126 on the bar 125 may be replaced by projections sensed by means of e.g. a light source and a photoelectric cell approximately in the same way as the projections 11, 12 on the test specimen are sensed.

As mentioned above, the weight 20 in the stretching apparatus may consist of several part weights so that the loading of the test specimen 10 can be adapted to the stretchability of said specimen. FIGS. 8–11 show a suitable holder means for these part weights, as well as the function of said means. The embodiment illustrated of the holder means is intended for use with five part weights 20a, 20b, 20c, 20d and 20e forming together the weight 20. Of these, the part weight 20e is secured to the cord or wire 18 while the remaining part weights have a central hole through which the wire extends so that these part weights are movable relative to the wire. The holder means comprises four identical gripping means generally designated 150a, 150b, 150c and 150d. The four gripping means 150 are mounted on two shafts 152 and 154 which are connected to the frame (not shown) of the stretching apparatus. The different gripping means 150 are carried by a body 156, and each gripping means 150 comprises a pneumatic or hydraulic cylinder 158, a piston rod 160, a yoke 162, two links 164 and 166, two gripping jaws 168 and 170, a pin 172, two bolts 174 and 176 and a two-part bushing or bearing sleeve 178. The cylinder 148 is secured to one end of the body 156, and the piston rod 160 of the cylinder extends into said body. The yoke 162 is secured to the free end of the piston rod 160 and is movable to and fro within the body 156 when the cylinder is supplied with pressure fluid. The two links 164 and 166 have their one ends pivotally connected to the yoke 162 by means of the pin 172. The link 164 has its other end pivotally connected with the gripping jaw 168 which is in the shape of a two-armed lever. The link 166 has its other end pivotally connected with the gripping jaw 170 which is also in the shape of a two-armed lever. The gripping jaw 168 is pivotally mounted on the shaft 152 by means of the two-part bushing or bearing sleeve 178, and the gripping jaw 170 is pivotally mounted on the shaft 154 by means of a two-part bearing sleeve (not shown) similar to the bearing sleeve 178. The body 156 is supported by the shafts 152 and 154 which extend through bores 180 in said body.

The gripping jaws 168 and 170 are provided each with an upstanding arcuate flange 182 and 184, respectively. These flanges serve to immobilize the part weight in question when it is grasped by the gripping jaws. The appearance of the part weights 20a, 20b, 20c, 20d and 20e is seen from FIGS. 10 and 11. The part weight 20e is secured to the wire 18 for limited swinging movement relative to said wire, and the part weights 20a, 20b, 20c and 20d are provided each with a through bore 186, through which the wire 18 extends and in which the wire can move without carrying the part weight 20a, 20b, 20c and 20d along. The last-mentioned part weights are provided each with an annular flange 188 of L-shaped cross section, while the part weight 20e does not possess any flange. FIG. 11 shows how the flanges 182 and 184, respectively, of the gripping jaws 168 and 170 engage the flange 188 of the part weight 20a.

In the following the function of the holder means will be explained with special reference to FIGS. 10 and 11. With the holder means in normal position, all gripping means 150 are in normal position (shown by dash lines in FIG. 8), the part weights 20a, 20b, 20c, 20d and 20e depending freely between the open gripping jaws 168 and 170. If the test specimen 10 to be tested is to be stretched under the action of one part weight only, pressure fluid is supplied to the cylinder 158 of the gripping means 150a in such a way that the gripping jaws 168 and 170 are swung to operative position (shown by full lines in FIG. 8) so that they will occupy the position shown in FIG. 10 relative to the part weight 20a. When the testing proper is initiated the wire 18 moves downwards, whereby the weight 20 also moves downwards. When the weight 20 has moved a small distance downwards the flanges 182 and 184 of the gripping jaws will engage the flange 188 of the part weight 20a so that said part weight and the overlying part weights 20b, 20c and 20d will be retained. The test specimen 10 will therefore be loaded with the part weight 20e only. At finished testing the part weights are returned to their positions shown in FIG. 10, and the gripping jaws 168 and 170 in the gripping means 150a return to normal position (shown by dash lines in FIGS. 8 and 10). If the test specimen 10 is to be loaded with two weights the gripping means 150b is operated instead of gripping means 150a, and when testing starts, part weight 20b will be grasped and will retain part weights 20c and 20d while part weight 20a will follow the part weight 20e in its downward movement. Otherwise, the procedure remains the same.

The holder means shown in FIGS. 8–11 for the weight 20 constituted by part weights is particularly suitable for use in an automatic rubber testing apparatus in which test specimens and data cards (one for each test specimen) are fed in series to the clamping mechanism and control and recording means, respectively. The automatic testing apparatus loads each individual test specimen according to the data on the data card of the test specimen, and then prints the test result on the data card, whereupon the test specimen and the data card are fed to collection points and a new test specimen and its data card are fed to the clamping mechanism and control and recording means, respectively.

FIG. 12 shows an embodiment of a data card 200 for an automatic or semiautomatic testing apparatus. In this embodiment the data card is in the form of a punched card. It is obvious, however, that the data card can have any suitable form. In addition to the ordinary spaces for quality information, batch number, batch weight, date and remarks, the data card 200 also has a space 202 comprising five printed or otherwise marked areas 204, 206, 208, 210 and 212. In the data card 200 shown a hole has been punched in area 208 and this means that the test specimen in question is to be loaded with 30 kilograms per square centimetre of cross-sectional area. The data card 200 also has a space 214 in which the testing apparatus automatically prints a checking indication 216 which shows that the test specimen was actually loaded with the intended load. In the present instance the checking indication 216 is the number 30 which shows that the test specimen was loaded with 30 kilograms per square centimetre. Finally, the data card 200 has a space 218 where the test result proper is printed. At the last-mentioned printing on one hand a scale 220 and on the other hand a marking arrow 222 are printed, said arrow pointing to the test result on the scale. In the embodiment illustrated the scale 220 directly gives the percentage elongation of the test specimen as calculated on the length between the projections 11 and 12 of the test specimen prior to the stretching thereof.

An embodiment of a semiautomatic testing apparatus will be described in the following with special reference to FIGS. 13–15. FIGS. 13 and 14 diagrammatically show a mechanism, included in the testing apparatus, for sensing the data card 200 and for printing the test result. This mechanism comprises a rotatable type plate 230 carried by a shaft 232. The shaft 232 corresponds to the shaft 59 in the measuring apparatus shown in FIG. 2, and the type plate 230 is a substitute of the pointer 66, while the dial 67 has been eliminated in the semiautomatic testing apparatus. Another type plate 234 is disposed laterally of the type plate 230 and is stationary relative to said plate. The type plate 230 carries types 236 which in printing are reproduced as the scale 220 on the data card 200, while the type plate 234 carries on one hand an arrow-shaped type 238 which is reproduced as the arrow 222 on the data card 200, and on the other hand five different types 240 which are reproduced as the checking indication 216 on the data card. Spaced a small distance from the type plates 230 and 234 are a big printing hammer 242 and five small printing hammers 244, 246, 248, 250 and 252. Disposed between the six printing hammers and the type plates 230 and 234 are a ribbon 254 and the data card 200, the ribbon being situated between the printing hammers and the data card.

A great many ways of operating printing hammers are known, and FIG. 13 diagrammatically shows, for the printing hammer 242, an electromechanical way of operating a printing hammer. The printing hammer 242 is operated by a solenoid 256 by means of a two-armed lever 258. The lever 258 is spring-actuated in such a way that the printing hammer 242 is retracted when the solenoid is deenergized. The energization of the solenoid is controlled by a time-delay means 260 which is responsive to the deenergization of the magnetic clutch 58 (see FIG. 2) and which connects the solenoid to a source of current shortly after the magnetic clutch 58 has been deenergized and the shaft 232 (corresponds to shaft 59 in FIG. 2) consequently has stopped in an angular position representing the elongation of the test specimen. The printing hammer 242 will therefore reproduce on the data card 200 the types 236 and 238 in the form of the scale 220 and the arrow 222 in the relative position these types occupied when the magnetic clutch 58 was deenergized, whereby the test result is recorded on the data card.

The five printing hammers 244, 246, 248, 250 and 252 are operated in the same way as the printing hammer 242 but their solenoids are not controlled by any time-delay means. These solenoids are controlled in a manner to be described in the following.

Arranged laterally of the type plate 234 are five sensing means in the form of five photoelectric cells S*a*, S*b*, S*c*, S*d* and S*e*. The photoelectric cells are adapted to sense in which area 204, 206, 208, 210 and 212 a hole has been punched. Still another photelectric cell S*o* is disposed adjacent the type plate 234, and this photoelectric cell serves to sense if any data card is inserted in the control and recording means. On the same side of the data card 200 as the printing hammers there is disposed a rod-shaped lamp 262 which illuminates the data card. When no data card is inserted in the control and recording means all photoelectric cells will thus be illuminated. If a data card in which a hole has been punched in area 208 is inserted in the control and recording means the photoelectric cell S*c* only will be illuminated while the data card intercepts the light to the other photoelectric cells. The photoelectric cells S*a*, S*b*, S*c*, S*d*, S*e* and S*o* are included in the wiring diagram shown in FIG. 15.

FIG. 15 shows the wiring diagram of the control and recording means. A two-pole main switch 300 is adapted to connect the control and recording means to a current supply (not shown). One pole of the main switch 300 is connected to a bus line 302 and the other pole of the main switch is connected to another bus line 304.

The wiring diagram includes the six photoelectric cells S*a*, S*b*, S*c*, S*d* and S*e* mentioned in connection with the description of FIGS. 13 and 14. The photoelectric cells S*a*, S*b*, S*c*, S*d* and S*e* are connected each to one relay R*a*, R*b*, R*c*, R*d* and R*e*, respectively. The photoelectric cells S*a*, S*b*, S*c*, S*d* and S*e* are such as to energize their associated relays when they are illuminated by the lamp 262 (see FIG. 13). Each of the relays R*a*, R*b*, R*c* and R*d* has a break contact R*a*1, R*b*1, R*c*1 and R*d*1, respectively, and two make contacts R*a*2 and R*a*3, R*b*2 and R*b*3, R*c*2 and R*c*3, and R*d*2 and R*d*3, respectively. The relay R*e* on the other hand has one break contact R*e*1 and three make contacts R*e*2, R*e*3 and R*e*4. The wiring diagram further includes a relay R*f* which has a break contact R*f*1, and a relay R*g* which has a make contact R*g*1. A single pole double throw switch 306 which has two fixed contacts 308 and 310 and a movable contact 312 the position of which is controlled in dependence of the position of the weight 20 or the wire 18. A push button switch 314, a diode 316 and a condenser 318 are also included in the wiring diagram. The different gripping means 150 for the part weights of the weight 20 are controlled by magnetically operated valves M which connect the cylinder 158 of the gripping means 150 to a pressure fluid supply, and these valves M are also included in the wiring diagram. Thus, the magnetically operated valve M*a* controls the gripping means 150*a*, the valve M*b* the gripping means 150*b*, the valve M*c* the gripping means 150*c*, and the valve M*d* the gripping means 150*d*. It appears from FIG. 15 that the gripping means 150 actuates a 2-gang single pole throw switch C*a* which has two coupling sections C*a*1 and C*a*2. Although it has not been shown in the drawings, the gripping means 150*b*, 150*c* and 150*d* each actuate a 2-gang single pole single throw switch C*b*, C*c* and C*d*, respectively, and each of these switches has two coupling sections C*b*1 and C*b*2, C*c*1 and C*c*2, and C*d*1 and C*d*2, respectively, which are, however, shown in the wiring diagram. Finally the lamp 262 (see FIG. 13) and the starting device 264 of the testing apparatus are also included in the wiring diagram.

In FIG. 15 all components are shown in a de-energized state since the main switch 300 has interrupted the connection to the current supply. In addition to the bus lines 302 and 304 the wiring diagram includes another bus line 320 one end of which is connected to the break contact R*f*1 of the relay R*f* and the other end of which is connected to one terminal of the push button switch 314.

The lamp 262 is connected between the bus lines 302 and 304. The make contacts R*a*2, R*b*2, R*c*2, R*d*2 and R*e*2 of the relays R*a*, R*b*, R*c*, R*d* and R*e* are connected in parallel between the bus lines 302 and 320. The magnetically operated valve M*a* is connected in series with the make contact R*a*3 of the relay R*a* while the valve M*b* is connected in series with the make contact R*b*3 of the relay R*b*, the valve M*c* is connected in series with the make contact R*c*3 of the relay R*c* and the valve M*d* is connected in series with the make contact R*d*3 of the relay R*d*. The magnetically operated valves M*a*, M*b*, M*c* and M*d* with their associated relay contacts R*a*3, R*b*3, R*c*3 and R*d*3 are connected in parallel between the bus lines 320 and 304. As already mentioned, one end of the bus line 320 is connected to the break contact R*f*1 of the relay R*f*, and this break contact in turn is connected to the photoelectric cell S*o* so that the break contact R*f*1 can open and close the connection between the bus line 320 and the photoelectric cell S*o*. The relay contact R*f*1 and the photoelectric cell S*o* are connected in series between the bus line 320 and a fourth bus line 322. The photoelectric cell S*o* is so designed that when illuminated by the lamp 262 it breaks the connection between the relay contact R*f*1 and the bus line 322, and when it is not illuminated by the lamp 262—i.e. when a data card 200 is situated in the data card holder of the control and recording means—it closes the connection between the relay contact R*f*1 and the bus line 322. The connection between the bus line 320 and the bus line 322 can thus be broken on one hand by the relay contact R*f*1 and on the other hand by the photoelectric cell S*o*. The five photoelectric cells S*a*, S*b*, S*c*, S*d*, and S*e* are connected in series each with the relay coil of a relay R*a*, R*b*, R*c*, R*d* and R*e*, respectively. The photo electric cells S*a*, S*b*, S*c*, S*d* and S*e* with their associated relay coils are connected in parallel between the bus line 322 and the bus line 304. The photoelectric cells S*a*, S*b*, S*c*, S*d* and S*e* are such that when illuminated by the lamp 262 they close the connection between the bus lines 322 and 304, over their associated relay coil.

The movable contact 312 of the single pole double throw switch 306 is connected to the bus line 302. One fixed contact 308 of the switch 306 is connected on one hand to the bus line 304 over the relay coil of the relay R*g* and on the other hand to the bus line 320 over the break contacts R*a*1, R*b*1, R*c*1, R*d*1 and R*e*1 of the relays R*a*, R*b*, R*c*, R*d* and R*e* and over the push button switch 314. The relay contacts R*a*1, R*b*1, R*c*1, R*d*1 and R*e*1 and the push button switch 314 are connected in series between the fixed contact 308 and the bus line 320, and for this reason the connection between the fixed contact 308 and the bus line 320 can be broken by means of either of these components. The condenser 318 is connected in series with the diode 316 and connects the fixed contact 310 of the single pole double throw switch 306 to the bus line 304. The coil of the relay R*f* and the make contact R*g*1 of the relay R*g* are connected in series between the diode 316 and the bus line 304 and thus in parallel with the condenser 318.

The printing hammers 244, 246, 248, 250 and 252 diagrammatically shown in FIG. 13 each have an operating coil P*a*, P*b*, P*c*, P*d* and P*e*, respectively. Between the bus lines 302 and 304 the operating coil P*a* is connected in series with the coupling section C*a*1 of the 2-gang single pole single throw switch C*a* actuated by the gripping means 150*a*, the operating coil P*b* is connected in series with the coupling section C*b*1 of the 2-gang single pole single throw switch C*b* (not shown) actuated by the gripping means 150*b*, the operating coil P*c* is connected in series with the coupling section C*c*1 of the 2-gang single pole single throw switch C*c* (not shown) actuated by gripping means 150*c*, the operating coil P*d* is connected in series with the coupling section C*d*1 of the 2-gang single pole single throw switch C*d* (not shown) actuated by the gripping means 150*d*, and the operating coil P*e* is connected in series with the make contact R$e$4 of the relay R$e$. The coupling sections C$a$2, C$b$2, C$c$2 and C$d$2 of the 2-gang single pole single throw switches C$a$, C$b$, C$c$ and C$d$ and the make contact R$e$3 of the relay R$e$ are mutually connected in parallel, and this parallel-connected assembly is connected in series with the starting device 264 of the testing apparatus between the bus lines 302 and 304 so that the testing apparatus will start when the switch C$a$, C$b$, C$c$ or C$d$ or the relay R$e$ is actuated.

The function of the control and recording means is as follows: When the testing apparatus is at rest the weight 20 occupies the position shown in FIG. 10 (the gripping jaws 168 and 170 of the gripping means 150$a$ in position of rest are moved apart to the positions shown by dash lines in FIG. 10), the movable contact 312 of the single pole double throw switch 306 occupying the position shown in FIG. 15. If the weight 20 moves downwards the movable contact 312 of said switch 306 will be moved from its application against the fixed contact 308 into application against the fixed contact 310.

When the two-pole main switch 300 is closed the bus lines 302 and 304 are connected to the current supply (not shown), the lamp 262 being thereby lighted. The coil of the relay R$g$ is then energized, whereby the make contact R$g$1 of the relay closes. The make contact R$g$1 will thus connect the fixed contact 310 of the switch 306 to the bus line 304 over the coil of the relay R$f$ but the relay will not be energized since the fixed contact 310 of the switch 306 is not connected to the bus line 302. The break contact R$f$1 of the relay R$f$ will therefore remain closed so that the bus line 320 remains connected to the photoelectric cell S$o$. The voltage of the bus line 302 is present also at one terminal of the push button switch 314 since the break contacts R$a$1, R$b$1, R$c$1, R$d$1 and R$e$1 of the relays R$a$, R$b$, R$c$, R$d$ and R$e$ are closed. The bus line 320 is without voltage since the coils of the relays R$a$, R$b$, R$c$, R$d$ and R$e$ are not energized.

If no data card is disposed in the data card holder of the control and recording means all photoelectric cells S$a$, S$b$, S$c$, S$d$, S$e$ and S$o$ are illuminated by the lamp 262. The photoelectric cell S$o$ has therefore broken the electric connection between the bus lines 320 and 322. The bus line 322 is connected to the bus line 304 over the coils of the relays R$a$, B$b$, R$c$, R$d$ and R$e$ and the photoelectric cells S$a$, S$b$, S$c$, S$d$ and S$e$ since these photoelectric cells are illuminated. If the switch 314 is now closed the bus lines 302 and 320 will certainly be connected but the coils of the relays R$a$, R$b$, R$c$, R$d$ and R$e$ are not energized since the photoelectric cell S$o$ is illuminated. The testing apparatus cannot therefore start because the coupling sections C$a$2, C$b$2, C$c$2 and C$d$2 of the 2-gang single pole single throw switches C$a$, C$b$, C$c$ and C$d$ as well as the make contact R$e$3 of the relay R$e$ are open. The operating coils P$a$, P$b$, P$c$, P$d$ and P$e$ of the printing hammers thus are not either actuated since the coupling sections C$a$1, C$b$1, C$c$1, and C$d$1 and the make contact R$e$4 of the relay R$e$ are also open.

If a data card is now inserted in the data card holder and if this data card has a hole punched in area 208, only the photoelectric cell S$c$ will be illuminated by the lamp 262 since the data card intercepts the light to the other photoelectric cells. The photoelectric cell S$o$ will thus connect the bus lines 320 and 322. As earlier, the relay R$f$ is not energized, and for this reason the break contact R$f$1 is closed. If the push button switch 314 is now actuated and the bus line 302 is connected to the bus line 320 the circuit between the bus lines 302 and 304 will be closed through the movable contact 312 of the switch 306, the fixed contact 308 of said switch 306, the break contacts R$e$1, R$d$1, R$c$1, R$b$1 and R$a$1, the switch 314, the line 320, the break contact R$f$1, the photoelectric cell S$o$, the line 322, the photoelectric cell S$c$ and the coil of the relay R$e$. The relay R$c$ will thus be energized, whereby the contact R$c$2 of the relay R$c$ connects the bus lines 302 and 320 and will serve as a holding contact for the relay. At the same time the connection between the fixed contact 308 of the switch 306 and the push button switch 314 is broken. In addition, the bus line 320 is connected to the bus line 304 through the make contact R$c$3 of the relay R$c$ and the magnetically operated valve M$c$. The valve M$c$ will therefore make the gripping means 150$c$ operative so that it grasps and retains the part weight 20$c$ and closes the 2-gang single pole single throw switch C$c$ (not shown). The operating coil P$c$ of the printing hammer 248 will thus be energized from the line 302 via the coupling section C$c$1 so that the printing hammer 248 prints on the data card the checking indication 216 which will thus be constituted by the number 30. At the same time the circuit between the bus lines 302 and 304 is closed over the coupling section C$c$2 and the starting device 264 of the testing apparatus. The testing apparatus will thus start, the part weights 20$e$, 20$a$ and 20$b$ moving downwards together with the wire 18 so that the stretching of the test specimen 10 is initiated. When the wire 18 and the part weights 20$a$, 20$b$ and 20$e$ begin to move downwards the movable contact 312 of the single pole double throw switch 306 is moved from the fixed contact 308 to the fixed contact 310. This will cut off the coil of the relay R$g$ from energization, and for this reason the make contact R$g$1 is opened. The voltage of the bus line will thus be present in the connection line between the diode 316 and the condenser 318. The voltage drop between the bus lines 302 and 304 will thus occur over the condenser 318 which is therefore charged.

When the testing proper, i.e. the stretching of the test specimen and the measuring of the distance between the projections 11 and 12 of the test specimen, has been effected and the printing hammer 242 has printed the test result in area 218 of the data card 200, the part weights 20$e$, 20$a$ and 20$b$ and the wire 18 are returned to their FIG. 10 positions by supplying the cylinder 57 (see FIG. 2) with pressure fluid in such a way that the rack 56 is moved toward the cylinder 57, the rack 52 and the parts secured thereto being returned to initial position. When the part weights and the wire 18 return to normal position the movable contact 312 of the single pole double throw switch 306 is moved from the fixed contact 310 to the fixed contact 308. The coil of the relay R$g$ will then be energized, whereby the make contact R$g$1 of the relay closes and discharges the condenser 318 over the coil of the relay R$f$. The relay R$f$ will therefore be attracted for a short time, whereby the break contact R$f$1 of the relay momentarily breaks the connection between the bus lines 320 and 322. This will interrupt the energization of the coil of the relay R$c$, and the self-holding of the relay over the make contact R$c$2 ceases. At the same time the energization of the magnetically operated valve M$c$ is broken, and for this reason the gripping means 150$c$ returns to normal position (shown by dash lines in FIG. 10). The 2-gang single pole single throw switch C$c$ (not shown) will thereby be opened so that the operating coil P$c$ of the printing hammer 248 and the starting device 264 of the testing apparatus will not any more be energized over the coupling sections C$c$1 and C$c$2. The control and recording means is thus ready for a new controlling and recording cycle.

Should the push button switch 314 be actuated mistakenly during the testing proper the coil of the relay R$g$ will not be energized since the break contact R$c$1 of the relay R$c$ is open and since the fixed contact 308 of the single pole double throw switch 306 is not connected to the movable contact 312.

The operating cycle of the control and recording means will be the same as in the foregoing if a hole is punched in any one of the areas 204, 206, 208 and 210 of the data card. The function of said control and recording means will, however, be slightly different if a hole is punched in area 212 of the data card 200.

If a data card 200 having a hole in area 212 is inserted in the data card holder, the photoelectric cell Se will be illuminated by the lamp 262 while the data card 200 intercepts the light to the other photoelectric cells. The connection between the bus lines 320 and 322 is thus closed over the break contact Rf1 of the non-energized relay Rf and the photoelectric cell So. If the push button switch 314 is operated and the connection between the bus lines 302 and 322 is thus closed over the movable contact 312 of the single pole double throw switch 306, the fixed contact 308 of said switch 306, the break contacts Re1, Rd1, Rc1, Rb1 and Ra1 of the relays Re, Rd, Rc, Rb and Ra and the switch 314, the coil of the relay Re will be energized since the bus lines 320 and 322 are electrically connected and since the photoelectric cell Se is illuminated. The make contact Re2 of the relay will therefore close the connection between the bus lines 302 and 320 and thus form a holding contact for the relay Re. At the same time the connection between the fixed contact 308 of the single pole double throw switch 306 and the push button switch 314 is broken by the break contact Re1 of the relay Re. Besides, the circuit between the bus lines 302 and 304 is closed by the make contact Re4 of the relay Re and the operating coil Pe of the printing hammer 252 so that said printing hammer will print the checking indication 216 in the form of the number 50 in area 214 of the data card 200. The make contact Re3 of the relay Re simultaneously closes the circuit between the bus lines 302 and 304 over the starting device 264 of the testing apparatus. The testing proper is thus started, the movable contact 312 of the single pole double throw switch 306 being moved from the fixed contact 308 to the fixed contact 310. As earlier, this will interrupt the energization of the coil of the relay Rg and open the make contact Rg1 of said relay. The condenser 318 will thus be charged. At the end of the testing the movable contact 312 of the single pole double throw switch 306 is again moved to the fixed contact 308, whereby the coil of the relay Rg is energized and the make contact Rg1 discharges the condenser 318 over the coil of the relay Rf. The relay Rf will thus be momentarily attracted, whereby the self-holding of the relay Re over the relay contact Re2 is broken by the break contact Rf1 of the relay Rf. The control and recording means is thus ready for a new operating cycle.

What we claim and desire to secure by Letters Patent is:

1. Apparatus for testing rubber comprising means for clamping a test specimen having an elongated body portion and two projections located at a predetermined distance from each other along the body portion and extending in the same direction therefrom, means for stretching the test specimen with a predetermined force specified for the test specimen and increasing the distance between the projections, a transmitter for transmitting a sensing radiation beam, a receiver for receiving the beam from said transmitter, mounting means supporting said transmitter and said receiver in fixed and spaced relation relative to other, means for moving said transmitter and said receiver along the stretched test specimen past the two projections thereon so as to intercept the beam between said transmitter and said receiver by the projections of the test specimen, said receiver being adapted to generate a first output signal when the beam is intercepted by one of the projections of the test specimen, and a second output signal when the beam is intercepted by the other projection, means connected to said receiver and responding to the output signals thereof for starting a measuring run in response to the first output signal from said receiver and stopping the measuring run in response to the second output signal from said receiver, and means operated by said last mentioned means for indicating a test result value based on the increase of the distance between the projections of the stretched test specimen as determined by the measuring run.

2. The apparatus of claim 1 in which said means for moving said transmitter and said receiver along the stretched test specimen comprises means for moving said transmitter and said receiver at a constant rate.

3. The apparatus of claim 2 in which said means for indicating the test result value comprise a pointer instrument visualizing the test result value and an electric motor for driving the pointer of said pointer instrument at a constant rate, and in which said means connected to said receiver and responding to the output signals thereof comprise bistable switching means for controlling said motor, said bistable switching means being triggered by the electric output signals from said receiver so as to start said motor in response to the first output signal from said receiver, and to stop said motor in response to the second output signal from said receiver whereby said pointer instrument will visualize the test result value.

4. Apparatus for testing rubber comprising means for clamping a test specimen having an elongated body portion and two projections located at a predetermined distance from each other along the body portion and extending in the same direction therefrom, means for stretching the test specimen with a predetermined force specified for the test specimen and increasing the distance between the projections, a transmitter for transmitting a sensing radiation beam, a receiver for receiving the beam from said transmitter, mounting means supporting said transmitter and said receiver in fixed and spaced relation relative to each other, a reference bar fixedly connected to said mounting means, reference areas uniformly distributed along the length of said reference bar, means for moving said transmitter, said receiver and said reference bar in the longitudinal direction of the stretched test specimen past the two projections thereon so as to intercept the beam between said transmitter and said receiver by the projections of the test specimen, said receiver being adapted to generate a first electric output signal when the beam is intercepted by one of the projections of the test specimen, and a second electric output signal when the beam is intercepted by the other projection, sensing means responding to said reference areas on said reference bar and generating a sensing output signal each time said sensing means senses one of said reference areas, bistable switching means connected to said receiver and responding to the electric output signals thereof, and means operated by said bistable switching means and responding to the sensing output signals of said sensing means for indicating a test result value based on the increase of the distance between the projections, said bistable switching means being triggered by the electric output signals of said receiver so as to connect said means for indicating the test result value with said sensing means in response to the first electric output signal of said receiver and disconnect the same in response to the second electric output signal of said receiver.

5. The apparatus of claim 4 in which said reference areas uniformly distributed along the length of said reference bar comprise magnetic areas, and in which said sensing means responding to said reference areas comprises a magnetic sensing head generating an electric sensing output signal each time said magnetic sensing head senses one of said magnetic areas, and in which said means operated by said bistable switching means and responding to the electric sensing output signals of said magnetic sensing head for indicating a test result value comprise a pulse counter.

6. Apparatus for testing rubber comprising means for clamping a test specimen having an elongated body portion and two projections located at a predetermined distance from each other along the body portion and extending in the same direction therefrom, means for stretching the test specimen with a predetermined force specified for the test specimen and increasing the distance between the projections, a first transmitter for transmitting a first sensing radiation beam, a first receiver for receiving the beam from said first transmitter, mounting means supporting said first transmitter and said first receiver in fixed and spaced relation relative to each other, a gear rack fixedly connected with said mounting means, means for moving said first transmitter, said first receiver and said gear rack in the longitudinal direction of the stretched test specimen past the two projections thereon so as to intercept the beam between said first transmitter and said first receiver by the projections of the test specimen, said first receiver being adapted to generate a first output signal when the beam from said first transmitter is intercepted by one of the projections of the test specimen and a second output signal when the beam is intercepted by the other projection, a gear meshing with said gear rack, a second transmitter for transmitting a second sensing radiation beam, a second receiver for receiving the beam from said second transmitter, chopper means in the path of the second sensing radiation beam, means drivingly connecting said gear with said chopper means, said chopper means being adapted, when driven, to intercept the second sensing radiation beam from said second transmitter to said second receiver, said second receiver being adapted to generate an output signal each time the second sensing radiation beam from said second transmitter is intercepted by said chopper means, bistable switching means connected to said first receiver and responding to the output signals thereof, and means operated by said bistable switching means and responding to the output signals of said second receiver for indicating a test result value based on the increase of the distance between the projections, said bistable switching means being triggered by the output signals of said first receiver so as to connect said means for indicating the test result value with said second receiver in response to the first output signal of said first receiver and disconnect the same in response to the second output signal of said first receiver.

7. The apparatus of claim 6 in which said first and second transmitters comprise a first and a second light source, respectively, generating a light beam and in which said first and second receivers comprise a first and a second photoelectric cell, respectively, responding to the light beam from said first and said second light source, respectively.

8. The apparatus of claim 6 in which said means for indicating a test result value comprise a pulse counter.

9. Apparatus for testing rubber comprising means for clamping a test specimen having an elongated body portion and two projections located at a predetermined distance from each other along the body portion and extending in the same direction therefrom, means for stretching the test specimen with a predetermined force specified for the test specimen and increasing the distance between the projections, means responsive for data recorded on a data carrier and predetermined for the test specimen, means responding to said data responsive means and determining the predetermined force specified for the test specimen, a transmitter for transmitting a sensing radiation beam, a receiver for receiving the beam from said transmitter, mounting means supporting said transmitter and said receiver in fixed and spaced relation relative to each other, means for moving said transmitter and said receiver along the stretched test specimen past the two projections thereon so as to intercept the beam between said transmitter and said receiver by the projections of the test specimen, said receiver being adapted to generate a first output signal when the beam is intercepted by one of the projections of the test specimen, and a second output signal when the beam is intercepted by the other projection, starting means automatically starting a test cycle when said means responding to said data responsive means has determined the force specified, means connected to said receiver and responding to the output signals thereof for starting a measuring run in response to the first output signal from said receiver and stopping the measuring run in response to the second output signal from said receiver, and means operated by said last mentioned means for indicating a test result value based on the increase of the distance between the projections of the stretched test specimen as determined by the measuring run.

10. Apparatus for testing rubber comprising means for clamping a test specimen having an elongated body portion and two projections located at a predetermined distance from each other along the body portion and extending in the same direction therefrom, means for stretching the test specimen with a predetermined force specified for the test specimen and increasing the distance between the projections, a transmitter for transmitting a sensing radiation beam, a receiver for receiving the beam from said transmitter, mounting means supporting said transmitter and said receiver in fixed and spaced relation relative to each other, a gear rack fixedly connected with said mounting means, means for moving said transmitter, said receiver and said gear rack in the longitudinal direction of the stretched test specimen so as to intercept the beam between said transmitter and said receiver by the projections of the test specimen, said receiver being adapted to generate an output signal each time the beam from said transmitter is intercepted by the projections of the test specimen, gear means meshing with said gear rack, a magnetic clutch, an input member of said magnetic clutch, an output member of said magnetic clutch, means for visualizing a test result value based on the increase of the distance between the projections on the test specimen, means drivingly connecting said gear means with said input member, means drivingly connecting said output member with said means for visualizing the test result value, brake means connected with said output member and with said means for visualizing the test result value, and means responsive to the output signal of said receiver for controlling said magnetic clutch so as to drivingly connect said gear means with said means for visualizing the test result value when the sensing radiation beam is intercepted by the first one of the two projections on the test specimen, and to disconnect said gear means from said means for visualizing the test result value when the sensing radiation beam is intercepted by the other one of the projections on the test specimen, whereby the means for visualizing the test result value will be stopped by said brake means in a position for visualizing the test result value.

11. The apparatus of claim 10 in which said transmitter comprises a light source generating a light beam and in which said receiver comprises a photoelectric cell responding to the light beam from said light source.

12. The apparatus of claim 10 in which said receiver comprises means for generating an electric output signal each time the beam is intercepted by the projections of the test specimen and in which said means responsive to the output signal of the receiver for controlling said magnetic clutch comprise bistable switching means for controlling said magnetic clutch, said bistable switching means being triggered by the electric output signal from said receiver.

13. Apparatus for testing rubber comprising means for clamping a test specimen having an elongated body portion and two projections located at a predetermined distance from each other along the body portion and extending in the same direction therefrom, means for stretching the test specimen with a predetermined force specified for the test specimen and increasing the distance between the projections, means responsive to data recorded on a data carrier and predetermined for the test specimen, means responding to said data responsive means and determining the predetermined force specified for the test specimen, a transmitter for transmitting a sensing radiation beam, a receiver for receiving the beam from said transmitter, mounting means supporting said transmitter and said receiver in fixed and spaced relation relative to each other, a gear rack fixedly connected with said mounting means, means for moving said transmitter, said receiver and said gear rack in the longitudinal direction of the stretched test specimen past the two projections thereon so as to intercept the beam between said transmitter and said receiver by the projections of the test specimen, said receiver being adapted to generate an output signal each time the beam from said transmitter is intercepted by the projections of the test specimen, starting means for automatically starting the movement of said means for simultaneously moving said transmitter, said receiver and said gear rack when said means responding to said data responsive means has determined the force specified, gear means meshing with said gear rack, a magnetic clutch, an input member of said magnetic clutch, an output member of said magnetic clutch, indicating means for indicating a test result value based on the increase of the distance between the projections on the test specimen, recording means for automatically recording the test result value indicated by said indicating means, means drivingly connecting said gear means with said input member, means drivingly connecting said output member with said indicating means, brake means connected with said output member and with said indicating means, and means responsive to the output signals of said receiver for controlling said magnetic clutch so as to drivingly connect said gear means with said indicating means when the sensing radiation beam is intercepted by the first one of the two projections on the test specimen, and to disconnect said gear means from said indicating means when the sensing radiation beam is intercepted by the other one of the projections on the test specimen, whereby said indicating means will be stopped by said brake means in a position for indicating the test result value and said recording means will record the test result value.

References Cited by the Examiner
FOREIGN PATENTS 1,271,762 8/1961 France.
892,432 3/1962 Great Britain.

RICHARD C. QUEISSER, *Primary Examiner.*